(12) United States Patent
Obermuller (10) Patent No.: US 9,222,533 B2
(45) Date of Patent: Dec. 29, 2015

(54) EMERGENCY STOP DEVICE FOR A ROTARY PLATFORM OF A MILKING PARLOUR (75) Inventor: Helmut Obermuller, Bromma (SE)

(73) Assignee: DELAVAL HOLDING AB, Tumba (SE)

( * ) Notice: Subject to any disclaimer, the term of this patent is extended or adjusted under 35 U.S.C. 154(b) by 186 days.

(21) Appl. No.: 13/820,600

(22) PCT Filed: Sep. 2, 2011

(86) PCT No.: PCT/SE2011/051058
§ 371 (c)(1),
(2), (4) Date: Mar. 4, 2013

(87) PCT Pub. No.: WO2012/033445
PCT Pub. Date: Mar. 15, 2012

(65) Prior Publication Data
US 2013/0153360 A1 Jun. 20, 2013

Related U.S. Application Data (60) Provisional application No. 61/380,515, filed on Sep. 7, 2010.

(30) Foreign Application Priority Data

Sep. 7, 2010 (SE) ........................ 1050917

(51) Int. Cl.
A01J 5/00 (2006.01)
A01K 1/12 (2006.01)
F16D 63/00 (2006.01)

(52) U.S. Cl.
CPC ................ F16D 63/00 (2013.01); A01K 1/126 (2013.01)

(58) Field of Classification Search
CPC ....... A01K 1/12; A01K 1/126; A01K 1/0017; A01K 1/0041; A01K 5/02; A01J 5/00; A01J 5/0135

USPC .......... 119/14.03, 14.04, 14.01, 14.14, 14.18, 119/843; 192/139, 129 R, 129 A
See application file for complete search history.

(56) References Cited

U.S. PATENT DOCUMENTS 3,095,854 A   7/1963  Bott et al.
3,835,814 A * 9/1974  Jacobs et al. ................ 119/14.04
(Continued)

FOREIGN PATENT DOCUMENTS

AU  1388476 A  11/1977
DE  3416546 A1 11/1985
(Continued)

OTHER PUBLICATIONS

Russian Supplemental Search Report, dated Nov. 29, 2012, from corresponding PCT application.
(Continued)

Primary Examiner — David Parsley
Assistant Examiner — George Andonyan
(74) Attorney, Agent, or Firm — Young & Thompson (57) ABSTRACT An emergency stop device for a rotary platform (1) of milking parlor for a milking parlor that includes at least one component (10, 13a) arranged beside an edge portion (1a, 1b) of the platform (1). The emergency stop device includes a detecting element (13b) adapted to initiate an emergency stop of the rotary platform (1) in a case of an object being detected in a detecting area (13b1) located beside the edge portion (1a, 1b) of the platform (1) at an upstream distance (D) from the component (10, 13a) with respect to the rotary direction of the platform (1). The upstream distance (D) is longer than an estimated stopping distance (d) of the edge portion (1b) when the platform (1) is emergency stopped.

19 Claims, 6 Drawing Sheets (56) References Cited

U.S. PATENT DOCUMENTS

| | | | |
|---|---|---|---|
| 3,934,551 A * | 1/1976 | Sulzberger | 119/14.04 |
| 6,539,896 B1 | 4/2003 | Larsen | |
| 7,640,888 B2 * | 1/2010 | Holscher et al. | 119/14.04 |
| 2008/0017119 A1 * | 1/2008 | Van Den Berg et al. | 119/14.04 |
| 2010/0126421 A1 | 5/2010 | Nahues et al. | |
| 2012/0210938 A1 * | 8/2012 | Hofman et al. | 119/14.02 |

FOREIGN PATENT DOCUMENTS

| | | |
|---|---|---|
| DE | 202008011507 U1 | 2/2010 |
| EP | 0717926 A1 | 6/1996 |
| GB | 1398596 A | 6/1975 |
| SU | 546327 A | 3/1977 |
| SU | 649373 A | 2/1979 |
| SU | 1727730 A1 | 4/1992 |

OTHER PUBLICATIONS

International Search Report, dated Mar. 1, 2012, from corresponding PCT application.

International-Type Search Report dated Feb. 25, 2011, from corresponding PCT application.

* cited by examiner

EMERGENCY STOP DEVICE FOR A ROTARY PLATFORM OF A MILKING PARLOUR

THE BACKGROUND OF THE INVENTION AND PRIOR ART

The present invention relates to an emergency stop device for a rotary platform in a milking parlour, wherein the milking parlour comprises at least one component arranged beside an edge portion of the platform and wherein the emergency stop device comprises detecting means adapted to initiate an emergency stop of the rotary platform in case an object is detected in a detecting area.

In a conventional parallel rotary parlour, the cows walk onto an annular rotating platform and enter a milking stall. An operator or a milking robot located on the outside or on the inside of the annular platform, attaches teat cups to the teats of the cows. The platform may rotate continuously with a constant low speed. The milking process for a cow has finished when the cow has rotated nearly 360 degrees on the platform. The continuous flow of cows make rotary parlours have a high milking capacity.

There is a risk that operators working in the vicinity of a rotary platform get stuck in the platform or in an apparatus or the like arranged on the platform. In this case, the operator may be dragged by the rotary platform. There is here a risk that the operator is squeezed between the rotary platform and a component arranged beside the platform. Such a component may be for example a milking robot, a teat cup storing device, a teat cup cleaning device or a stationary post or the like.

SUMMARY OF THE INVENTION

The object of the present invention is to achieve an emergency stop device for a rotary platform ensuring that an operator who gets stuck in the platform or a part of it will not be squeezed between the platform and a component arranged beside the platform.

This object is achieved by the emergency stop device initially defined, which is characterised in that the detecting area is located beside the edge portion of the platform at an upstream distance from said component with reference to the rotary direction of the platform, wherein said upstream distance is longer than an estimated stopping distance of said edge portion when the platform is emergency stopped. In case an object such as an operator gets stuck in the platform, this will be detected by the detecting means when the operator has been dragged to the detecting area. When this happens, the detecting means initiates an emergency stop of the platform. Since the detecting area is located at a longer distance from the component than the estimated stopping distance of said edge portion of the platform, the platform will be stopped before the operator reaches the component. Thereby, the risk that the operator is squeezed between the platform and the component is eliminated. The emergency stopping distance of a platform may be for example 5 to 10 cm at an edge portion of the platform. The detecting means may in this case be arranged at a distance of, for example, 10 to 50 cm from the component. Preferably, the detecting area is arranged relatively close to the component such that there is no risk that an operator gets stuck in the platform in a position between the detecting area and the component. The detecting means may, for example, comprise a vertical light beam or the like which is broken when an object reaches the detecting area.

According to an embodiment of the invention, the detecting area has a vertical edge portion arranged closer to or at the same distance from a vertical axis through the nearest edge portion of the platform than all surfaces of the component. In this case, there is no risk that an object, which risks being squeezed between the platform and the component, will move past the detecting area without initiating an emergency stop of the rotary platform. Preferably, the detecting area has at least the same height as the component. Thereby, it is not possible for an upper part of the object to pass above the detecting area and be squeezed between the platform and the component.

According to a preferred embodiment of the invention, the detecting means comprises a movable unit, movably arranged in a direction substantially parallel to the direction of motion of the nearest located part of the edge portion, wherein an emergency stop of the rotary platform is initiated when the movable unit is displaced from a first position. The movable unit may be movably arranged along a curved path at a constant distance from the edge portion of the platform. Alternatively the movable unit may be movably arranged along a rectilinear path along the edge portion of the platform. Since the movable unit is movably arranged along a relatively short distance at an edge portion of a large rotary platform, such a rectilinear path is also substantially parallel to the direction of motion of the edge portion of the platform. Since the object is moved in substantially the same direction as the movable unit when they come into contact with each other, it is relatively easy for the object to displace the movable unit from the first position and initiate an emergency stop of the platform. The movable unit may comprise a contact surface defining at least a part of the detecting area when it is in the first position, wherein at least a part of the contact surface is perpendicular to the direction of motion of the nearest located part of the edge portion of the platform. An object hitting such a contact surface moves the movable unit from the first position such that an emergency stop of the rotary platform is initiated in a reliable manner.

According to a preferred embodiment of the invention, the emergency stop device comprises a stationary unit and supporting means allowing a movable support of the movable unit on the stationary unit. The contact surface of the movable unit is here located at a distance from the stationary unit such that the movable unit is able to perform the motion from the first position to the second position. The supporting means may comprise at least one rolling member and a rail member arranged in contact with said at least one rolling member. Such supporting means allows a well defined displacement path for the movable unit in relation to the stationary unit when it is displaced from the first position to the second position.

According to a preferred embodiment of the invention, the emergency stop device comprises maintaining means adapted to maintain the movable unit in the first position by means of a force. The force maintaining the movable unit in the first position has a suitable value. In order to prevent false emergency stops of the platform, the maintaining force has to be relatively large. On the other hand, the maintaining force should not be too large in order to ensure that all objects dragged by the rotary platform are capable of displacing the movable unit from the first position. The maintaining means may act with a spring force, an electromagnetic force or another kind of force on the movable unit. Advantageously, said maintaining means is adapted to act on the movable unit without or with a reduced force when the moving member has been moved from the first position. As soon as the movable unit has been moved from the first position, the emergency stop process of the platform has already been initiated. In this state, there is no reason to counteract the motion of the movable unit towards the second position.

According to an embodiment of the invention, the detecting means has a detecting area arranged at a distance from a component in the form of a robot arm in the milking parlour. A robot arm may be arranged at an edge portion of the platform. A milking robot is a powerful component which may injure an operator dragged by the platform. The detecting area may in this case be arranged at a suitable distance from a working area of the robot arm. The detecting area may be arranged at a distance from a component in the form of a post element in a fence arrangement. Stationary post elements of different kinds are many times arranged in the vicinity of the edge portion of a rotary platform. There is here a risk that a person or an object dragged by the platform is squeezed between the platform and such a stationary post element. A movable unit according to the invention may be placed at a suitable upstream distance of such a post element.

According to an alternative embodiment of the invention, the post element supports a light beam emitting member emitting at least one light beam forming a light beam barrier of the fence arrangement. Such a fence arrangement may be arranged around a working area of a milking robot. In case an operator, for example, breaks the light beam barrier, the milking robot is emergency stopped. The movable unit may have a design such that it breaks at least one light beam of the light beam barrier when it is displaced from the first position. In this case, the platform is also emergency stopped when the light beam barrier of the fence arrangement is broken.

According to an embodiment of the invention, the movable unit comprises an outer casing which substantially encloses the stationary unit. Such an outer casing may form the whole outer surface of the post element. Thereby, the risk is eliminated that an object dragged by the platform comes in direct contact with the stationary unit. Thus, there is no possibility for the object to move past the contact surface of the movable unit and come in contact with the stationary post element. Furthermore, such a casing provides a protection for the resilient means and the supporting means arranged between the movable unit and the stationary unit.

According to an embodiment of the invention, the detecting area may be located in the vicinity of an outer edge portion of the platform. In case the operators work beside the platform at an outer edge portion of the platform, it is suitable to arrange the detecting area at the vicinity of the outer edge portion of the platform. In case the platform is annular, the detecting area may be located at the vicinity of an inner edge portion of the platform. This is suitable when the operators work at an inner edge portion of the annular platform. It is certainly possible to arrange detecting areas at both the outer edge portion and the inner edge portion of an annular rotary platform.

BRIEF DESCRIPTION OF THE DRAWINGS

The present invention is now to be explained more closely by means of a preferred embodiment, which is disclosed as an example, and with reference to the attached drawings.

BRIEF DESCRIPTION OF A PREFERRED EMBODIMENT OF THE INVENTION

Figure 1:
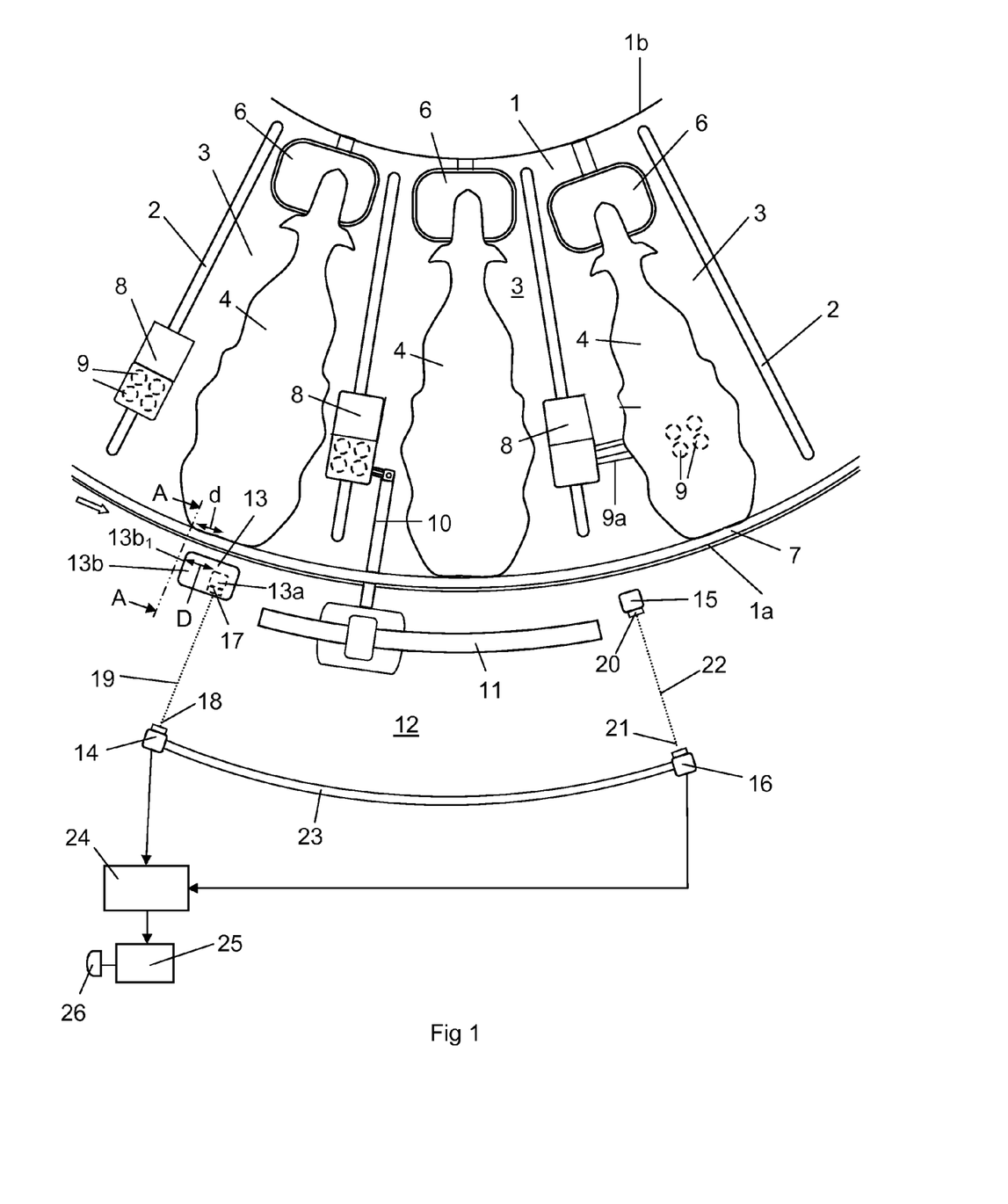
FIG. 1 shows a rotary milking platform provided with an emergency stop device according to the invention.

FIG. 1 shows a part of an annular rotary platform 1. The annular platform is defined by an outer radial edge portion 1a and a radial inner edge portion 1b. The platform 1 is provided with a plurality of side wall elements 2 each having a substantially radial extension on the platform 1. The side wall elements 2 divide the annular platform into a plurality of milking stalls 3. FIG. 1 shows three of the milking stalls 3 on the rotary platform 1. Each milking stall 3 contains a milking cow 4. The cows 4 are here positioned in a substantially radial direction on the annular platform 1 with the heads in the vicinity of the inner edge portion 1b of the platform 1.

Each milking stall 3 comprises a feeding trough 6. A rump rail 7 is arranged at a distance above a radial outer edge portion 1a of the platform 1. The rump rail 7 is adapted to define the positions of the rear portions of the cows 4 in the milking stalls 3. Each milking stall 3 comprises a teat cup storing device 8 adapted to store teat cups 9 to be used in the milking stall 3. Each teat cup storing device 8 holds four teat cups 9 in a parking position at a distance above the platform 1 on one side of the milking stall 3. The parked teat cups 9 are positioned in front of the rear legs and behind the front legs of the cow 4 in the milking stall 3. The teat cups 9 are parked relatively close to the teats of the cow 4.

Such a positioning of the storing device 8 results in a short pull out length of the milk tubes 9a when the teat cups 9 are attached to the teats of a cow 4 in the milking stall 3. Furthermore, the risk that the milk tubes 9a become entangled with each other during the milking process and a retracting process is relatively low. A milking robot arm 10 is adapted to attach the teat cups 9 to the teats of the cow 4. The robot arm 10 comprises a gripping unit at a free end portion adapted to grip the parked teat cups 9 in the storing device and attach them to the teats of a cow 4. The robot arm 10 is, in this case, suspended in an overhead rail member 11. The rail member 11 has a curved extension substantially vertically above the radially outer edge portion 1b of the 1 platform 1. The robot arm 10 is movably arranged along the rail member 11.

During operation of the rotary parlour, a cow 4 to be milked enters a milking stall 3 at a first rotation position. The cow 4 is here positioned in a milking position in the milking stall 3 where the rear legs of the cow 4 are relatively close to outer edge portion 1a of the platform 1. The robot arm 10 may be located in a resting position outside the outer edge portion 1a of the platform 1. The robot arm 10 is displaced from the resting position when the milking stall 3 reaches a second rotation position. The robot arm 10 grips the teat cups 9 in the storing device 8 and attaches them to the teats of the cow 4. All teat cups 9 are attached to the cow 4 when the milking stall 3 reaches a third rotation position. The milking process of the cow 4 starts in the third rotational position of the platform 1.

The milking robot 10 is movably arranged within a working area 12 located beside the platform 1. The working area 12 of the robot arm 10 is fenced by a fence arrangement. The fence arrangement is adapted to prevent accidental entering of the working area 12. The fence arrangement comprises four fence post elements 13, 14, 15, 16. A first fence post element 13 comprises a light beam generating unit 17 and a second fence post element 14 comprises a light beam sensing unit 18. A first light beam barrier 19 of the fence arrangement is formed between the post elements 13, 14. A third fence post element 15 comprises a light beam generating unit 20 and a fourth fence post element 16 comprises a light beam sensing unit 21. A second light beam barrier 22 of the fence arrangement is formed between the post elements 15, 16. The second and the fourth fence post elements 14, 16 is connected by at least one bar element 23 forming a mechanical barrier of the fence arrangement.

The light beam sensing members 18, 21 are connected to a control unit 24. The light beam barriers 19, 22 are adapted to inform the control unit 24 as soon as one of the light beam barriers 19, 22 is broken. The control unit 24 is connected to a schematically disclosed emergency stop unit 25 which is activated when one of the light barriers 19, 22 is broken. The emergency stop unit 25 is able to perform an emergency stop of the rotary platform 1 and the milking robot 10. The rotary platform 1 has an estimated stopping distance d in the vicinity of the outer edge portion 1a of the platform 1. The emergency stopping distance may be about 5 cm. The emergency stopping distance d is somewhat shorter at the inner edge portion 1b of the platform 1 than at the outer edge portion 1a. If the platform 1 and the milking robot 10 have been emergency stopped, it is possible to restart the platform and the milking robot 10 by means of a manual operating unit 26 such as a button or the like. If an operator enters the working area 12 of the milking robot by mistake or with the intent to do any work within the working area 12, one of the light beam barriers 19, 22 will be broken and the stop unit 25 stops the motion of the platform 1 and the robot arm 10. The risk that the operator is injured by the robot arm 10 in the working area 12 is thereby substantially eliminated.

There is a risk that operators working beside the rotary platform 1 will get stuck in a component on the platform 1. In this case, an operator may be dragged by the rotary platform 1. There is here a risk that the operator will be squeezed between the rotary platform 1 and a component arranged in the vicinity of the outer edge portion 1a or in the vicinity of the inner edge portion 1b of the platform 1. Such a component may, in this case, be the first post element 13. However, the first post element 13 has a design preventing such accidents.

Figure 2:
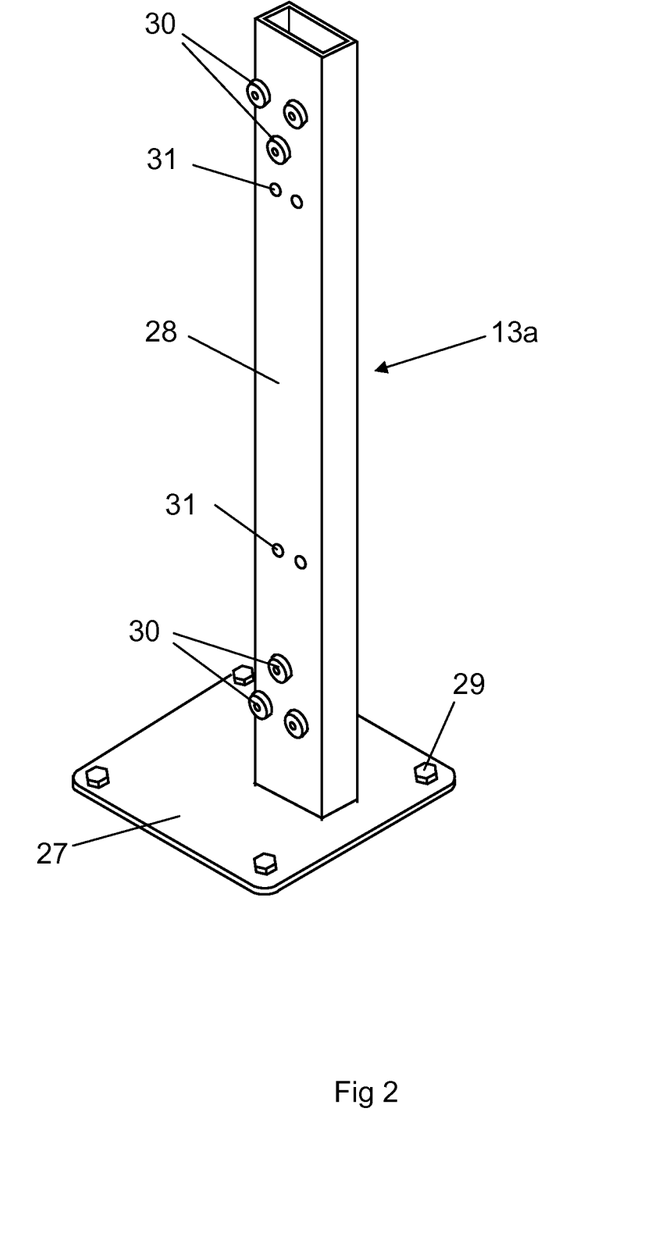
FIG. 2-5 show the post element in FIG. 1 during different mounting stages and FIG. 6 shows a view of the post element in a vertical plane A-A in FIG. 1.

FIGS. 2-5 show the first post elements 13 during different mounting stages. FIG. 2 shows a mounting plate 27 and a vertical post 28 of the first post element 13. The mounting plate 27 is fixedly attached to a floor or a ground surface beside the rotary platform 1 in the vicinity of the outer edge portion 1a or the inner edge portion 1b. The mounting plate 27 is here attached by means of bolts 29 arranged in holes of the mounting plate 27. The vertical post 28 is provided with four set of rollers 30 mounted at various heights and on opposite sides of the vertical post 28. The stationary vertical post 28 is also provided with mounting holes 31 for attachment of components on the stationary vertical post 28. The mounting plate 27 and the stationary vertical post 28 are parts of a stationary unit 13a of the first post element 13.

Figure 3:
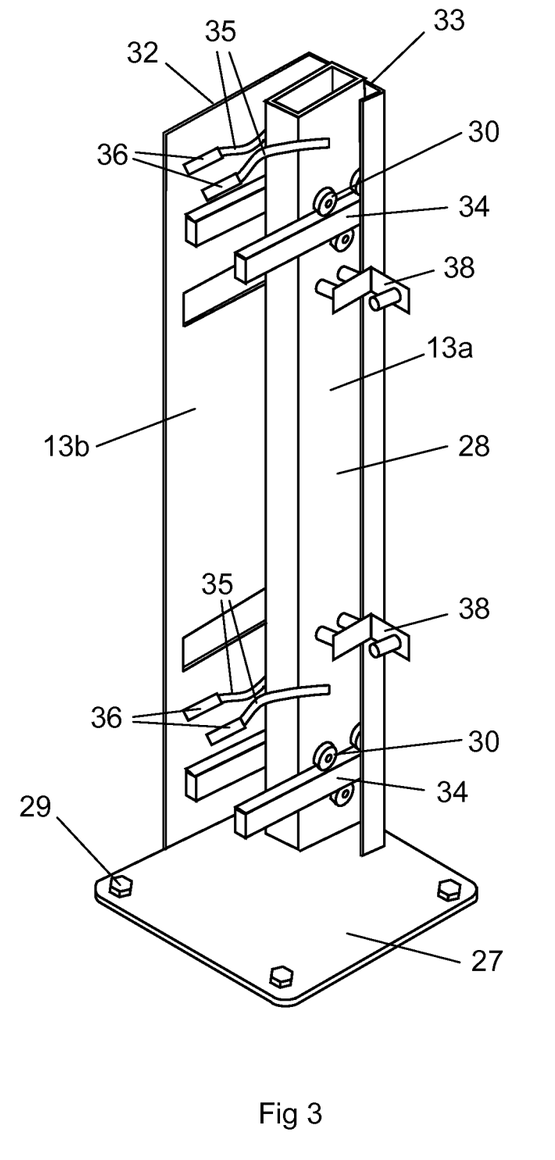

FIG. 3 shows the first post element 13 during a later mounting stage. A rear wall 32 and a first side wall 33 have now been movably mounted on the stationary vertical post 28. A front wall 39 and a second side wall 40 will later be mounted on the stationary vertical post 28. Four rail members 34 are connected to the inner sides of the walls 32, 33, 39, 40 in a suitable manner. Each rail member 34 is mounted in contact with a set of rollers 30 on the vertical post 28. Thereby, the walls 32, 33, 39, 40 will be displaceably mounted along a well defined path in relation to the stationary unit 13a of the first post element 13. Two pairs of leaf springs 35 are attached to the rear wall element 32 and the front wall element 39 by means of suitable fastening means 36. Each pair of leaf springs 35 forms a passage with a varying width for the vertical post 28 when the walls 32, 33, 39, 40 are displaced in relation to the vertical post 28. Two attachment members 38 are mounted in the mounting holes 31 of the vertical post 28.

Figure 4:
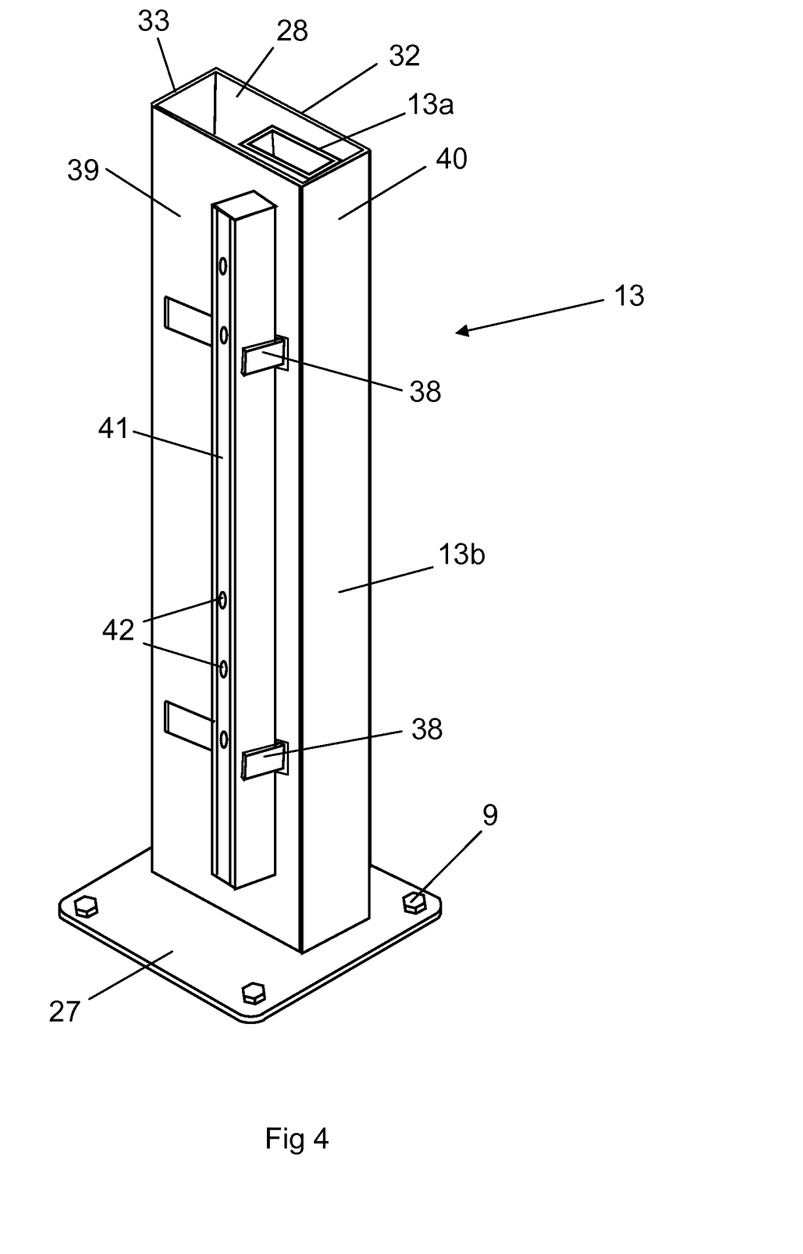

FIG. 4 shows the first post element 13 during a further later mounting stage. The front wall 39 and the second side wall 40 have now been mounted on the stationary vertical post 28. An elongated light beam generation unit 41 is fixedly mounted on the vertical post 28 by means of the attaching members 38. Thus, the light beam generating unit 41 forms a part of the stationary unit 13a of the first post element 13. The light beam generation unit 41 comprises a number of opening 42 at different high level emitting light beams.

Figure 5:
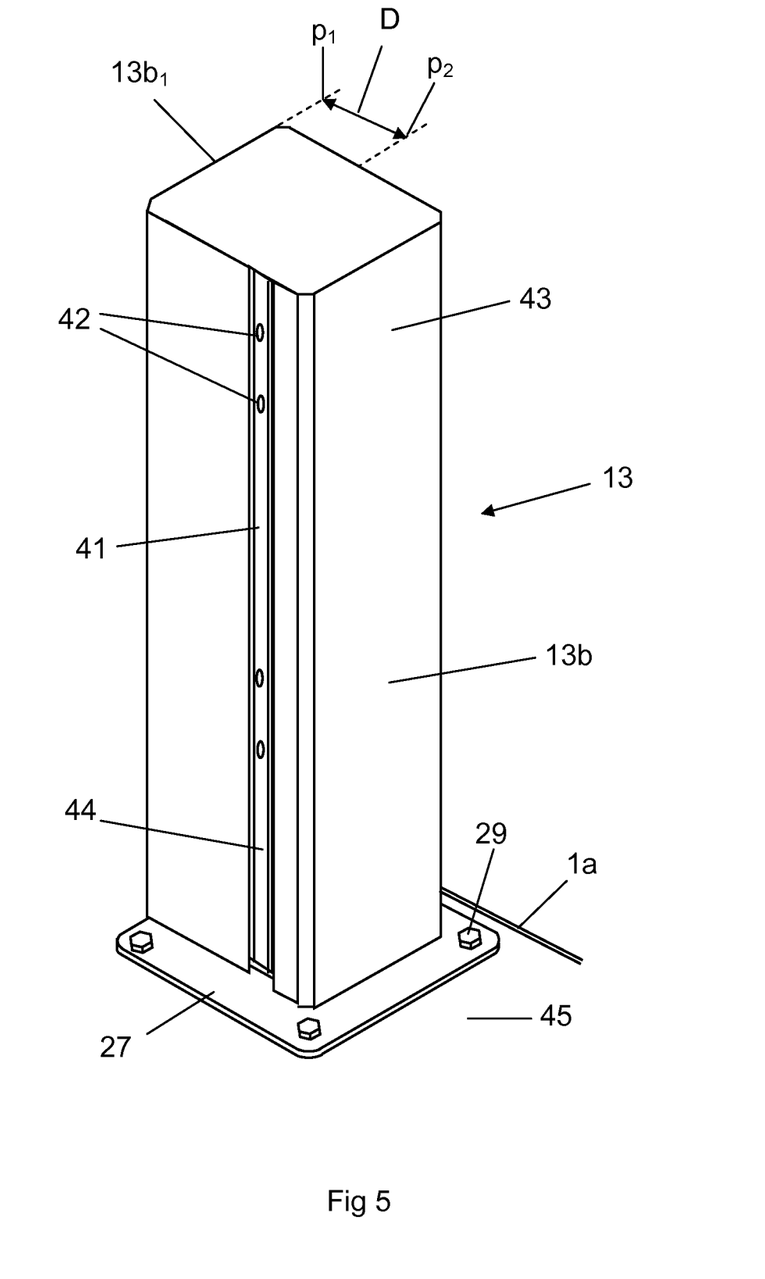

The FIG. 5 shows the first post element 13 in a ready state. The first post element 13 is mounted on a stationary floor surface 45 beside the outer edge portion 1a of the platform 1. An outer casing 43 has now been mounted around the walls 32, 33, 39, 40. The outer casing 43 has an elongated opening 44 at the vicinity of the openings 42 of the light beam generation unit 41. The outer casing 43 may be designed in one piece. The outer casing 43 may form substantially the whole outer surface of the first post element 13. The rail members 34, the walls 32, 33, 39, 40 and the outer casing 43 form parts of a movable unit 13b of the first post element 13.

The movable unit 13b comprises a contact surface $13b_1$. The contact surface $13b_1$ is substantially perpendicular to the direction of motion of the movable unit 13a and the nearest located part of the outer edge portion 1a of the platform 1. The movable unit 13a is displaceably arranged along a path from a first position $p_1$ to an end position $p_2$ located at a distance D from the first position $p_1$ in relation to the stationary unit 13a. The leaf springs 35 act with a spring force on the stationary vertical post 28 in order to maintain the movable unit 13b in the first position $p_1$. Consequently, a force of a predetermined value is required for moving the movable unit 13b from the first position $p_1$. The leaf springs 35 have a design making it relatively easy to displace the movable unit 13b to the end position $p_2$ as soon as the movable unit 13b has been displaced from the first position $p_1$.

The first post element 13 is mounted in a manner such that the movable unit 13b is displaceably arranged along a path which is substantially parallel to the direction of motion of the nearest located part of the outer edge portion 1a of the rotary platform 1. The platform has at the outer edge portion 1a an estimated emergency stopping distance d. The movable unit 13b is movable in a direction substantially parallel to the direction of motion of the nearest located part of the outer edge portion 1a. The movable unit 13b is movable from the first position $p_1$ to a position $p_2$ located at a longer distance from the first position $p_1$ than the estimated stopping distance d of the outer edge portion 1a of the platform 1 when it is emergency stopped.

It is possible that an operator, working beside the rotary platform 1 in the vicinity of the outer edge portion 1a of the platform, gets stuck in a component such as the teat cup storing device 8 on the rotary platform 1, or on the platform itself. In this case, the platform 1 rotates in a counter clockwise direction such that the operator may be moved by the rotary platform 1 in a counter clockwise direction towards the first post element 13. The operator comes initially in contact with the contact surface $13b_1$ of the movable unit 13b of the first post element 13. When the operator comes in contact with the contact surface $13b_1$, the movable unit 13b is displaced from the first position $p_1$.

At the same time as the movable unit 13b is displaced from the first position $p_1$, the narrow opening 44 of the outer casing 43 is displaced in relation to the openings 42 of the light beam generating unit 41 such that a wall surface of the outer casing 43 breaks the first light beam barrier 19. The light beam sensing unit 18 detects that the first light beam barrier 19 has been broken. The light beam sensing unit 18 informs the control unit 24 about this fact. The control unit 24 initiates activation of the emergency stop unit 25 which performs an emergency stop of the rotary platform 1 and the milking robot 10. Since the rotary platform 1 has a stopping distance d which is shorter than the displaceable distance D of the movable unit 13b, the operator does not come in contact with the stationary unit 13a of the first post element 13 before the platform is emergency stopped. Due to that fact, the operator is prevented from being squeezed between the platform 1 and the stationary unit 13a of the first post element 13. When the operator has come loose from the platform 1, the movable unit 13b is moved back to the first position $p_1$. The platform 1 and the milking robot 10 are restarted by means of the manual operating unit 26.

Figure 6:
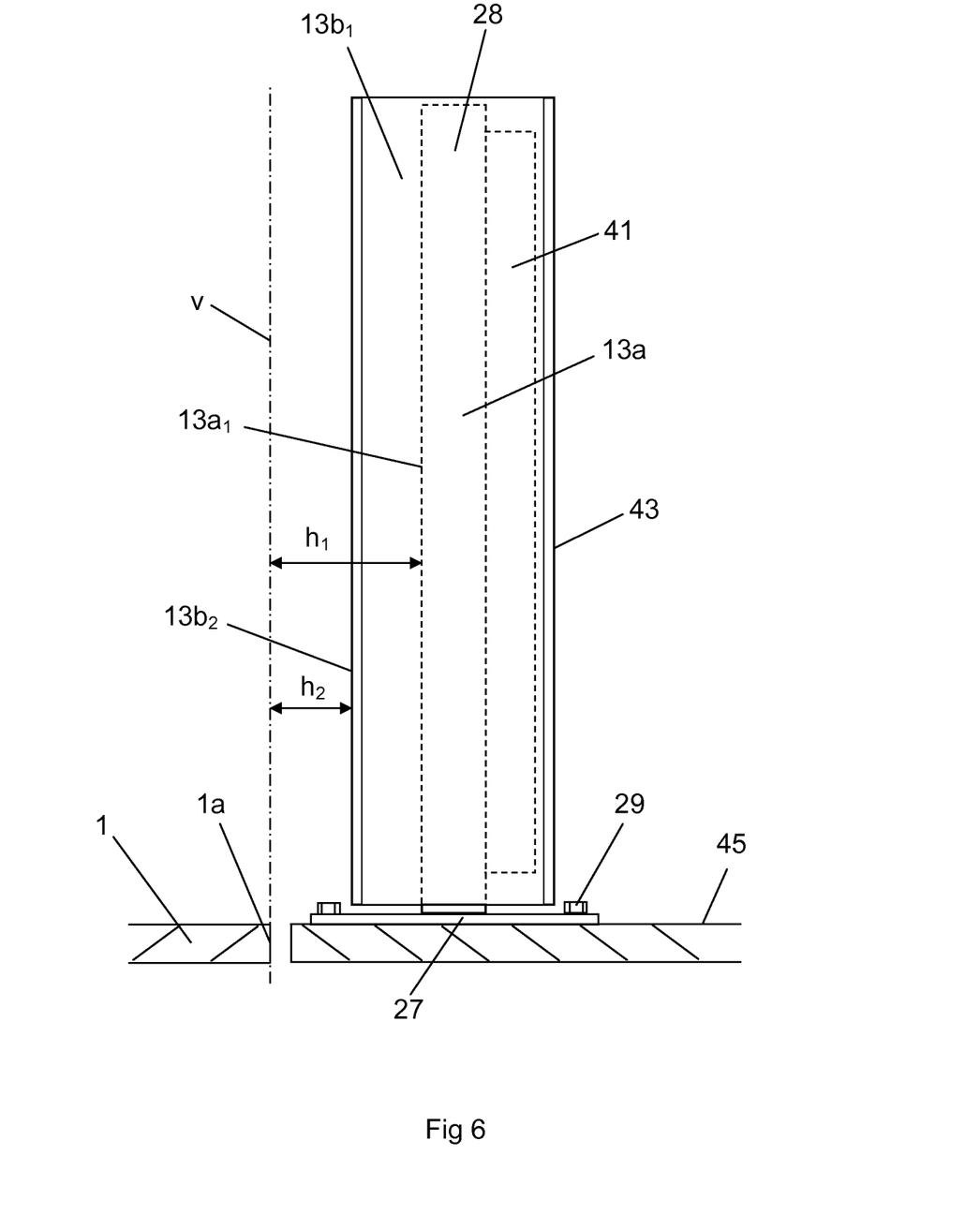

FIG. 6 shows the first post element 13 in the vertical plane A-A in FIG. 1. The contact surface $13b_1$ of the movable unit 13b has a substantially rectangular shape. The contact surface $13b_1$ has a vertical edge portion $13b_2$ arranged at a minimum horizontal distance $h_2$ from a vertical axis v through the nearest edge portion 1a of the platform 1. The stationary unit 13a which is arranged inside the outer casing 43 is indicated with dotted lines. The stationary unit 13a comprises the vertical post 28 and the light beam generation unit 41. The stationary unit 13a has a vertical surface $13a_1$ arranged at a minimum horizontal distance $h_1$ from a vertical axis v through the nearest edge portion 1a of the platform 1. Since the outer casing 43 forms the whole outer surface of the first post element 13, the vertical edge portion $13b_2$ of the contact surface $13b_1$ is arranged closer to the vertical axis v than all surfaces $13a_1$ of the component 13a. In this case, there is no risk that an object, which risks being squeezed between the platform 1 and the stationary unit 13a, will move past the contact surface $13b_1$ of the movable unit 13b without initiating an emergency stop of the rotary platform 1.

The invention is not limited to the described embodiments but may be varied and modified freely within the scope of the claims. The movable unit 13b may for example be maintained in the first position by means of another kind of force than a spring force such as an electromagnetic force. The invention is of course applicable to any type of rotary milking platform, not just the type described.

The invention claimed is:

1. An emergency stop device for automatically stopping a rotating rotary platform (1) in a milking parlour by the emergency stop device detecting when a person enters into a detecting area and emergency stopping the rotating rotary platform to avoid a risk of the person being squeezed between a moving edge portion of the platform and a stationary component located beside the edge portion of the platform, in combination with the rotary platform, the emergency stop device comprising:
   a detecting unit located on a stationary floor surface in the detecting area,
   the detecting area being located beside an edge portion of the platform at an upstream distance from the stationary component with reference to a rotary direction of the platform, the detecting unit initiating an emergency stop of the rotating platform when the detecting unit detects the person entering into the detecting area by the person hitting the detecting unit, the upstream distance being longer than an estimated stopping distance of the edge portion when the detecting unit emergency stops the rotating platform, wherein the stationary component is one of a group consisting of a teat-cup storing device, a teat-cup cleaning device, a post element, and a stationary part of a robot,
   the detecting unit comprising a stationary unit (13a), a movable unit (13b), and a supporting unit, wherein the supporting unit displaceably mounts the moveable unit on the stationary unit along a displacement path substantially parallel to a direction of motion of the edge portion of the platform located at the upstream distance from the stationary component, the movable unit having a displaceable contact surface (13b1) that defines at least a part of the detecting area, the stationary unit (13a) comprising a stationary vertical post (13a) mounted to the stationary floor surface, and the movable unit (13b) comprising an outer casing (43) that substantially encloses the stationary vertical post (13a) and provides the displaceable contact surface (13b1),
   wherein the outer casing (43) is displaceably arranged along the displacement path from a first initial position (p1) to a second end position (p2) located at a distance (D) from the first initial position in relation to the stationary unit, wherein the person hitting the outer casing (43) automatically moves the moveable unit along the displacement path from the first initial position (p1) to the second end position (p2), the movement from the first initial position (p1) causing the detecting unit to initiate the emergency stop of the rotating platform.

2. The emergency stop device of claim 1, wherein,
   the displacement path is a curved path at a constant distance from the edge portion of the platform located at the upstream distance from the stationary component, and
   the outer casing (43) comprises a front side having a width and a vertical height, a vertical edge of the front side being located adjacent the edge portion of the platform at a distance less than the width of the front side.

3. The emergency stop device of claim 1, wherein the displacement path is a rectilinear path, and
   the outer casing (43) includes a front side having a width and a vertical height, a vertical edge of the front side being located adjacent the edge portion of the platform at a distance less than the width of the front side.

4. The emergency stop device of claim 1, wherein the outer casing (43) is perpendicular to a direction of movement of the moveable unit and perpendicular to the direction of motion of the edge portion of the platform located at the upstream distance from the stationary component, and wherein the stationary component is one of the group consisting of a teat-cup storing device, a teat-cup cleaning device, and a stationary part of a robot.

5. The emergency stop device of claim 1, wherein the detecting unit further comprises a maintaining element maintaining the movable unit (13b) in the first initial position (p1) by a first force.

6. The emergency stop device of claim 1, wherein the detecting unit has a vertical height at least equal to the stationary component, and wherein the stationary component is one of the group consisting of a teat-cup storing device, a teat-cup cleaning device, and a stationary part of a robot.

7. The emergency stop device of claim 1, wherein, the supporting unit comprises at least one rolling member (30) and a rail member (34) arranged in contact with the at least one rolling member.

8. The emergency stop device of claim 1, wherein,
   the outer casing includes i) a front side having a width and a vertical height, and ii) two opposite sides extending from respective opposite vertical edges of the front side,
   the outer casing provides the contact surface (13b1) on the front side of the outer casing,
   a first of the two opposite sides is located adjacent the edge portion of the platform at a distance less than the width of the front side.

9. The emergency stop device of claim 1, wherein the outer casing includes a front side.

10. The emergency stop device of claim 1, wherein the rotary platform is annular and the detecting area is located at a vicinity of an inner edge portion (1b) of the rotary platform.

11. The emergency stop device of claim 1, wherein the detecting unit further comprises a maintaining element maintaining the outer casing (43) in the first initial position (p1) by a first force and with a second force when the moving member (13b) has been moved from the first initial position (p1), the second force being less than the first force.

12. The emergency stop device of claim 1, wherein the detecting unit is arranged with the outer casing (43) 10 to 50 cm upstream from the stationary component with reference to a rotary direction of the platform, and wherein the stationary component is one of the group consisting of a teat-cup storing device, a teat-cup cleaning device, and a stationary part of a robot.

13. The emergency stop device of claim 1, wherein the stationary component is a teat-cup storing device.

14. The emergency stop device of claim 1, wherein the stationary component is a cleaning device.

15. The emergency stop device of claim 1, wherein the stationary component is a post element.

16. The emergency stop device of claim 1, wherein the stationary component is a stationary part of a robot.

17. The emergency stop device according to claim 4, wherein the maintaining element comprises a spring (35) that provides the first force, the spring (35) acting with the spring force on the stationary unit (28) to maintain the outer casing (43) in the first position (p1).

18. The emergency stop device of claim 7, wherein the outer casing includes a front side.

19. A method of emergency stopping a rotating rotary platform in a milking parlour by an emergency stop device detecting when a person enters into a detecting area and then emergency stopping the rotating rotary platform to avoid a risk of the person being squeezed between a moving edge portion of the platform and a stationary component located beside the edge portion of the platform, the method comprising:

using the emergency stop device, automatically detecting when the person enters into the detecting area, wherein the emergency stop device comprises a detecting unit located on a stationary floor surface in the detecting area, the detecting area being located beside said moving edge portion of the platform at an upstream distance from the stationary component with reference to a rotary direction of the platform, the upstream distance being longer than an estimated stopping distance of the edge portion when the detecting unit emergency stops the rotating platform, wherein the stationary component is one of a group consisting of a teat-cup storing device, a teat-cup cleaning device, a post element, and a stationary part of a robot, and wherein the detecting unit automatically detects the person entering into the detecting area by the person hitting the detecting unit, the detecting unit comprising a stationary vertical post (13a) mounted to the stationary floor surface, a movable unit (13b) comprising an outer casing (43) that provides a displaceable contact surface (13b1) that substantially encloses the stationary vertical post (13a) and, and a supporting unit displaceably mounting the outer casing (43) on the stationary unit along a displacement path substantially parallel to a direction of motion of the edge portion of the platform located at the upstream distance from the stationary component, the outer casing (43) having the displaceable contact surface (13b1) that defines at least a part of the detecting area, the outer casing (43) being displaceably arranged along the displacement path from a first initial position (p1) to a second end position (p2) located at a distance (D) from the first initial position in relation to the stationary vertical post, and wherein the person hitting the displaceable contact surface automatically moves the outer casing (43) along the displacement path from the first initial position (p1) to the second end position (p2); and the detecting unit automatically initiating an emergency stop of the rotating platform when the moveable unit moves from the first initial position (p1).

* * * * *